(12) United States Patent
Wu

(10) Patent No.: US 8,199,497 B2
(45) Date of Patent: Jun. 12, 2012

(54) ELECTRONIC DEVICE ENCLOSURE AND ELECTRONIC DEVICE

(75) Inventor: Zhi-Ping Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 140 days.

(21) Appl. No.: 12/763,868

(22) Filed: Apr. 20, 2010

(65) Prior Publication Data
US 2011/0164378 A1     Jul. 7, 2011

(30) Foreign Application Priority Data
Jan. 4, 2010    (CN) .............................. 201020300055

(51) Int. Cl.
*G06F 1/16* (2006.01)
(52) U.S. Cl. ................... 361/679.58; 312/408; 248/429; 369/77.1

(58) Field of Classification Search .................. 361/690, 361/695, 679.33, 679.01, 679.02, 679.21, 361/679.22, 679.23, 679.27, 679.31, 679.32; 312/221, 110, 408, 334.8; 248/416, 58, 430, 248/429, 541; 369/75.1, 75.2, 77.1
See application file for complete search history.

(56) References Cited

U.S. PATENT DOCUMENTS

| 5,852,547 | A  | * | 12/1998 | Kitlas et al. .................. 361/695 |
| 7,106,586 | B2 | * | 9/2006  | Yu et al. ........................ 361/690 |
| 8,014,144 | B2 | * | 9/2011  | Cheng et al. ............. 361/679.33 |

* cited by examiner

*Primary Examiner* — Hung Duong
(74) *Attorney, Agent, or Firm* — Altis Law Group, Inc.

(57) ABSTRACT

An electronic device enclosure comprising a chassis, the chassis comprises a chassis bottom wall and a chassis rear wall connected to the chassis bottom wall. The chassis bottom wall is capable of mounting a motherboard with a module. An elastic flange is located on the chassis rear wall. The elastic flange is engaged with the module of the motherboard, and the motherboard is located between the flange and the motherboard. The invention further offers an electronic device.

10 Claims, 5 Drawing Sheets

ELECTRONIC DEVICE ENCLOSURE AND ELECTRONIC DEVICE

BACKGROUND

1. Technical Field

The present disclosure relates to an electronic device enclosure with a motherboard.

2. Description of Related Art

A computer chassis comprises a chassis rear wall, and a motherboard is secured in the computer chassis. USB (Universal Serial Bus) modules, audio modules, a network module and peripheral component interconnecting modules are mounted on the motherboard. USB interfaces, audio interfaces, a network interface and peripheral component interconnecting interfaces are defined on the chassis rear wall. However, parts of the motherboard can be displaced if the computer is struck, causing modules of the motherboard move out of alignment with the corresponding interfaces and even become disengaged from the interfaces.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
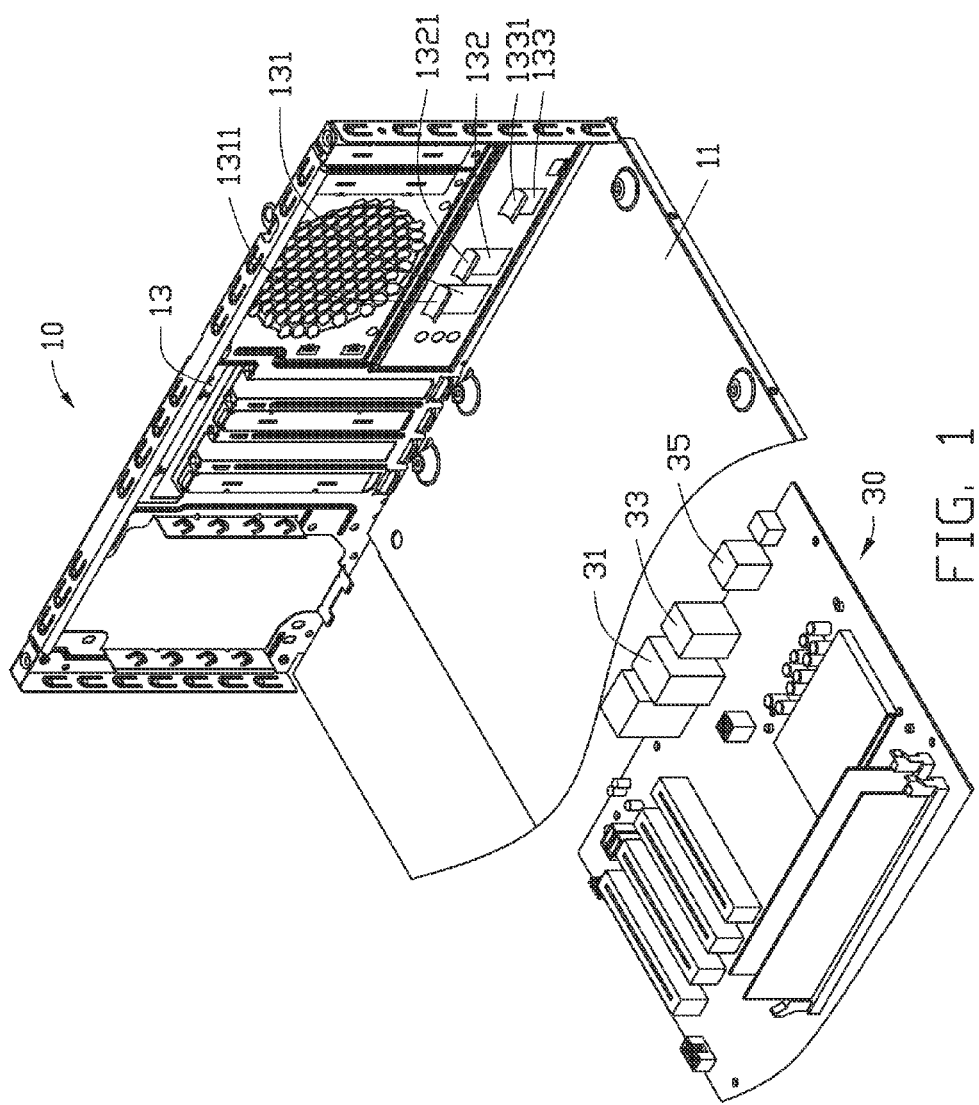
FIG. 1 is an exploded, isometric view of an electronic device enclosure in accordance with an embodiment.

Referring to FIG. 1, an electronic device enclosure in accordance with an embodiment includes a chassis 10. The chassis 10 can have any geometric shape, configuration, or orientation suitable for housing an electronic device therein. For simplicity and as an aid to the description, the chassis 10 is depicted as a cuboid (i.e., a partially or completely enclosed rectangular box) will be described herein, although other equally effective geometric shapes and configurations may exist in other embodiments. The chassis 10 includes a chassis bottom wall 11 and a chassis rear wall 13 connected to the chassis bottom wall 11. In one exemplary embodiment, the chassis rear wall 13 is substantially perpendicular to the chassis bottom wall 11.

A motherboard 30 is mounted on the chassis bottom wall 11. A first module 31, a second module 33, and a third module 35 are disposed on one side of the motherboard 30. In an exemplary embodiment, the first module 31 and the second module 33 are USB modules, the third module 35 is a network module used to connect a network card (not shown).

The chassis rear wall 13 defines a first opening 131, a second opening 132, and a third opening 133. The first, second, and third openings 131, 132, 133 are capable of engaging with the first, second, and third modules 31, 33, 35 on the motherboard 30, respectively. In an exemplary embodiment, the first, second and third openings 131, 132, 133 are rectangular. A first flange 1311, a second flange 1321, and a third flange 1331 are located on the chassis rear wall 13 and capable of abutting the first, second, and third modules 31, 33, 35, respectively. The first flange 1311 extends from an edge of the first opening 131, the second flange 1321 extends from an edge of the second opening 132, and the third flange 1331 extends from an edge of the third opening 133. In one exemplary embodiment, the first, second and third flanges 1311, 1321, 1331 are elastic. The width of the first flange 1311 is approximately the same as the width of the first module 31, the width of the second flange 1321 is approximately the same as the width of the second module 33, and the width of the third flange 1331 is approximately the same as the width of the third module 35. In an exemplary embodiment, the first flange 1311, the second flange 1321, and the third flange 1331 are arcuate.

In assembly, the motherboard 20 is mounted on the chassis bottom wall 11 by fasteners, such as screws, studs and so on, partially or completely inserted into complimentary threaded receivers (not labeled) defined in the chassis bottom wall 11 of the chassis 10. The first flange 1311 abuts the first module 31, the second flange 1321 abuts the second module 33, and the third flange 1331 abuts the third module 35. The first, second and third modules 31, 33, 35 correspond to the first, second, and third openings 131, 132, 133, respectively.

In use, when the chassis 10 suffers an impact, a first principal stress may be applied on the motherboard 30, however the first, second and third flanges 1311, 1321, 1331 respectively engaged with the first, second and third modules 31, 33, 35 will help prevent the motherboard 30 from being resiliently deformed relative to the chassis bottom wall 11, maintaining alignment between the first, second and third modules 31, 33, 35 and the first, second, and third openings 131, 132, 133.

Figure 3:
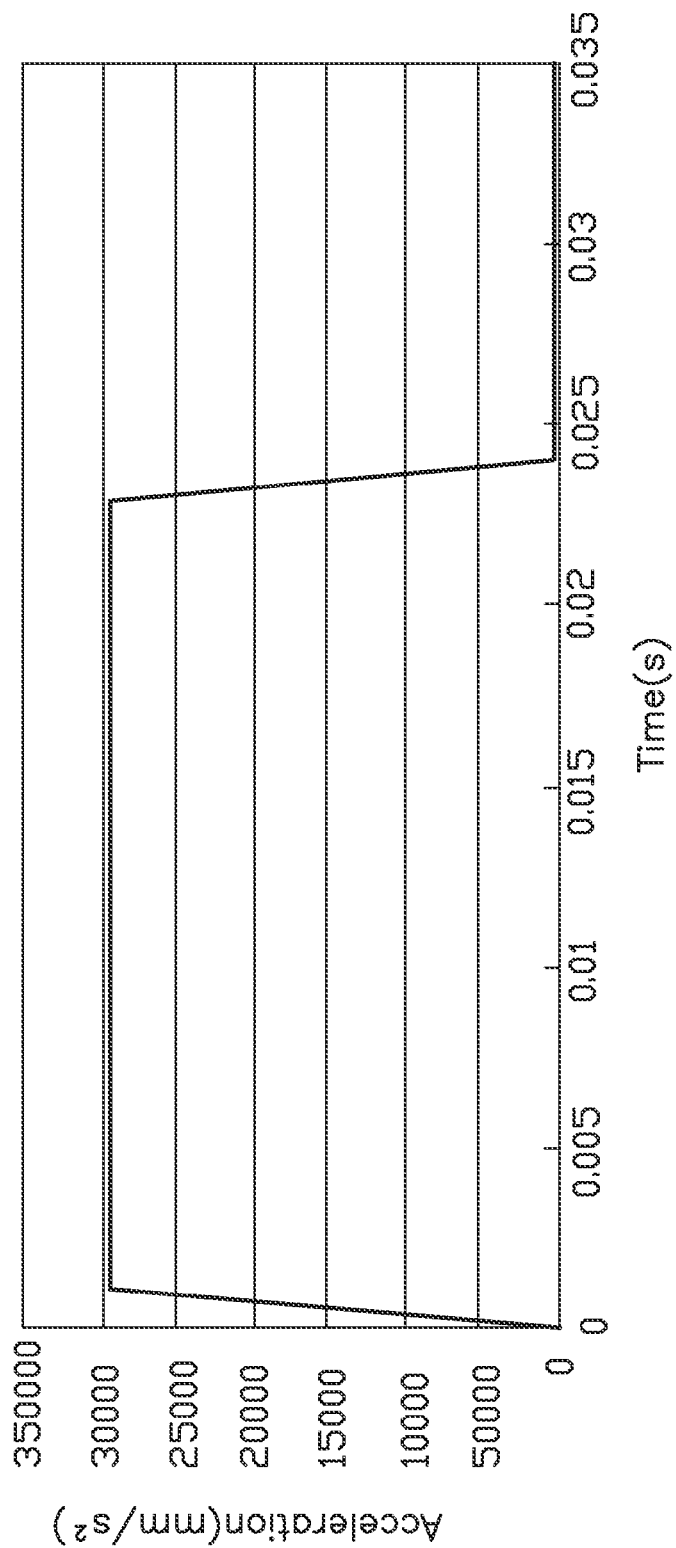
FIG. 3 is a graph showing an acceleration curve of an impact applied on an embodiment of the electronic device enclosure.
Figure 4:
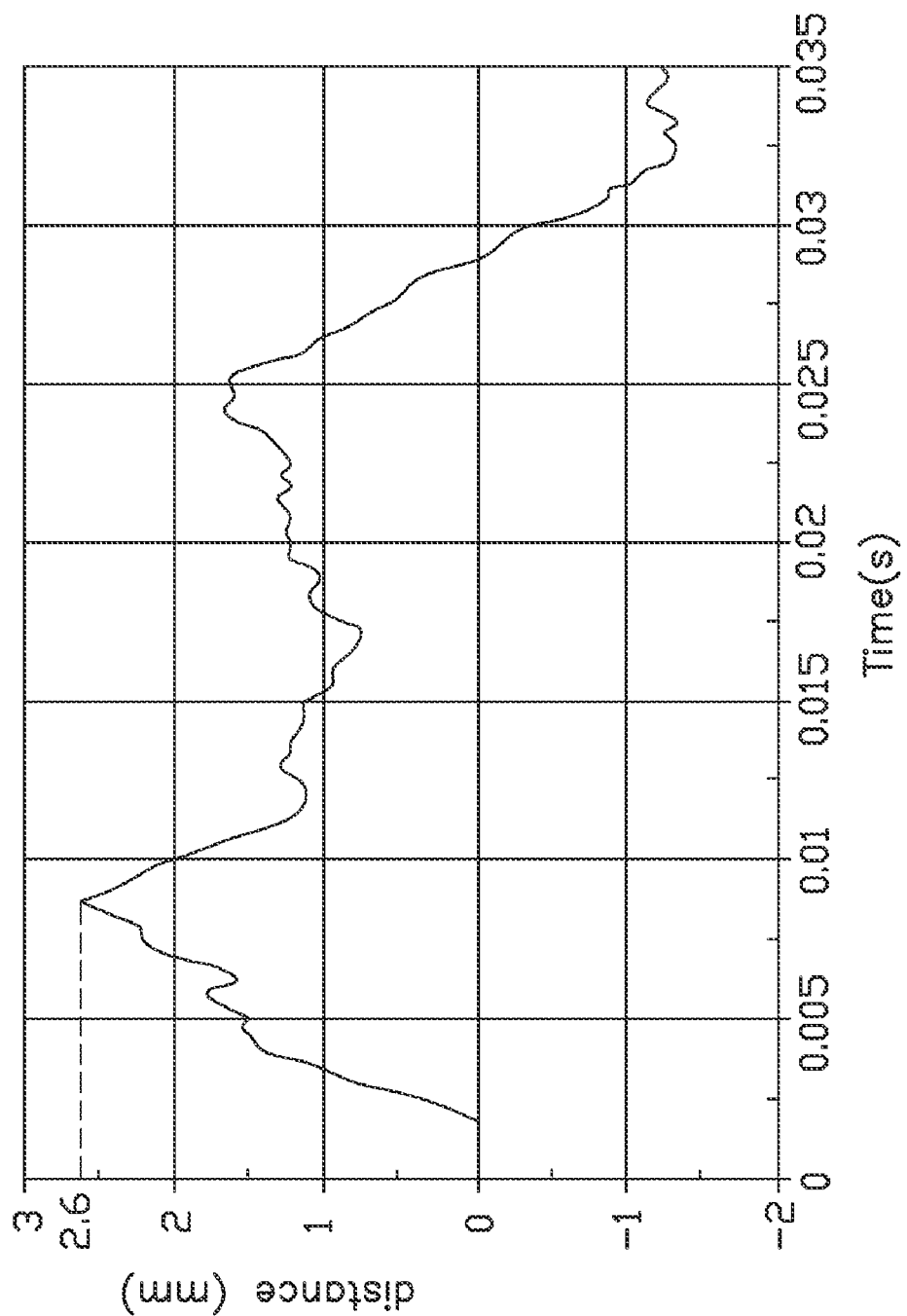
FIG. 4 is a graph illustrating displacement of a part of a motherboard secured in a conventional electronic device enclosure of a prior art embodiment enduring the impact of FIG. 3.
Figure 5:
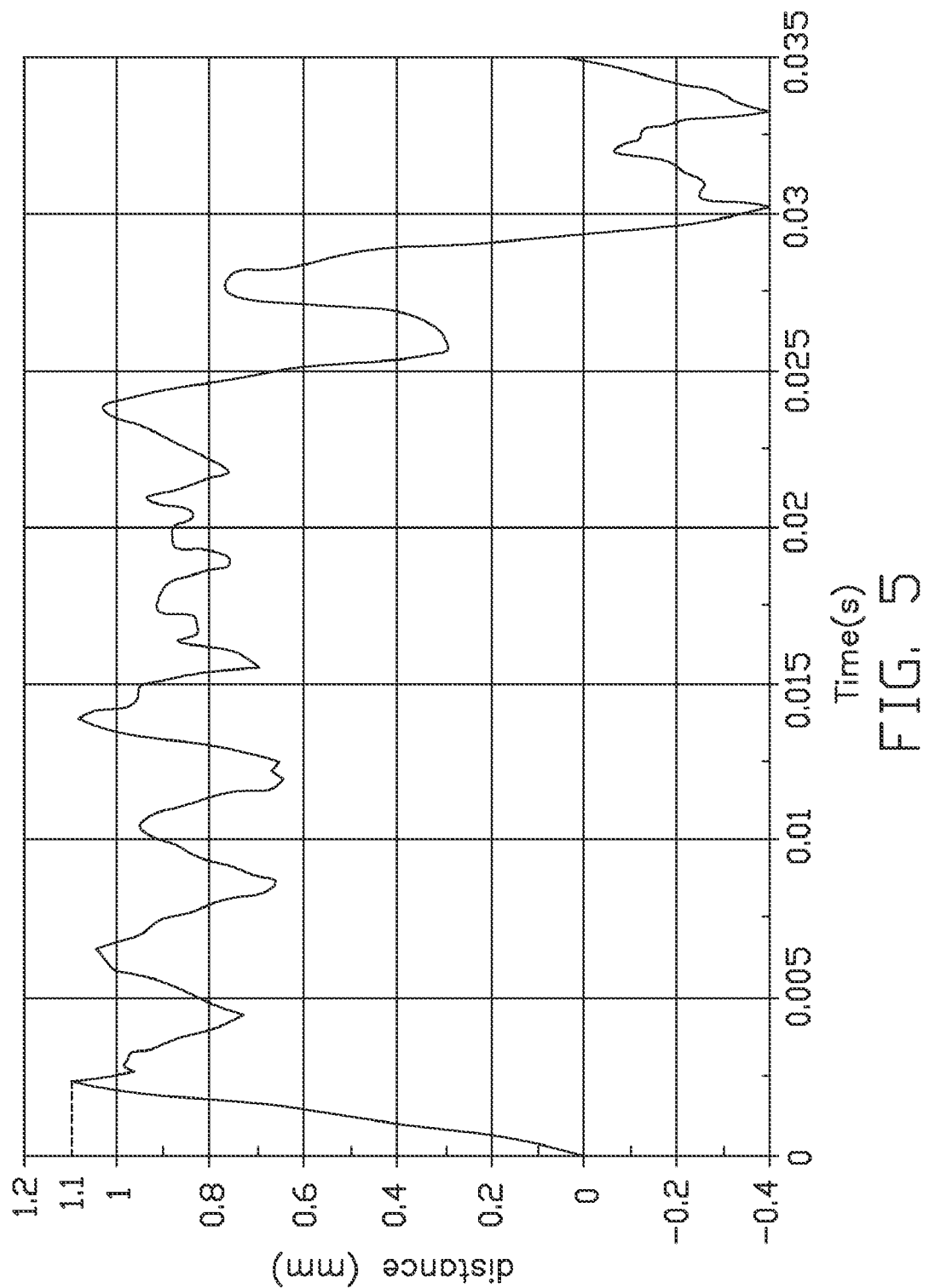
FIG. 5 is a graph illustrating of a part of the motherboard of the embodiment of FIG. 2 enduring the impact of FIG. 3.

Referring to FIGS. 3 to 5, a software LS-DYNA is used for simulating the first principal stress applied on the motherboard 30 when the chassis 10 suffers an impact. Generally, when the chassis 10 suffers an impact, the first, second and third modules 31, 33, 35 on the motherboard 30 correspondingly suffer a great stress. An acceleration curve (shown in FIG. 3) is used for simulating the impact on the chassis 10.

FIG. 4 shows the first principal stress distribution of a motherboard fixed in a conventional electronic device enclosure. When a chassis of the conventional electronic device enclosure suffers an impact, the tensile stress applied on a motherboard is great. The motherboard is attached on a bottom wall of the conventional chassis, and a part of the motherboard, where some modules are positioned, resiliently deforms relative to the bottom wall a distance (shown in FIG. 4) under the external force shown in FIG. 3. This will cause the modules on the motherboard to move out of alignment with the openings in a rear wall of the conventional chassis. Referring to FIG. 4, the distance the motherboard resiliently deforms in one direction is often greater than one millimeter, and as much as 2.6 millimeters, and as much as minus 1.2 millimeters (not labeled) in the opposite direction. The distances are great enough to disengage modules on the motherboard attached to the openings in the rear wall.

Figure 2:
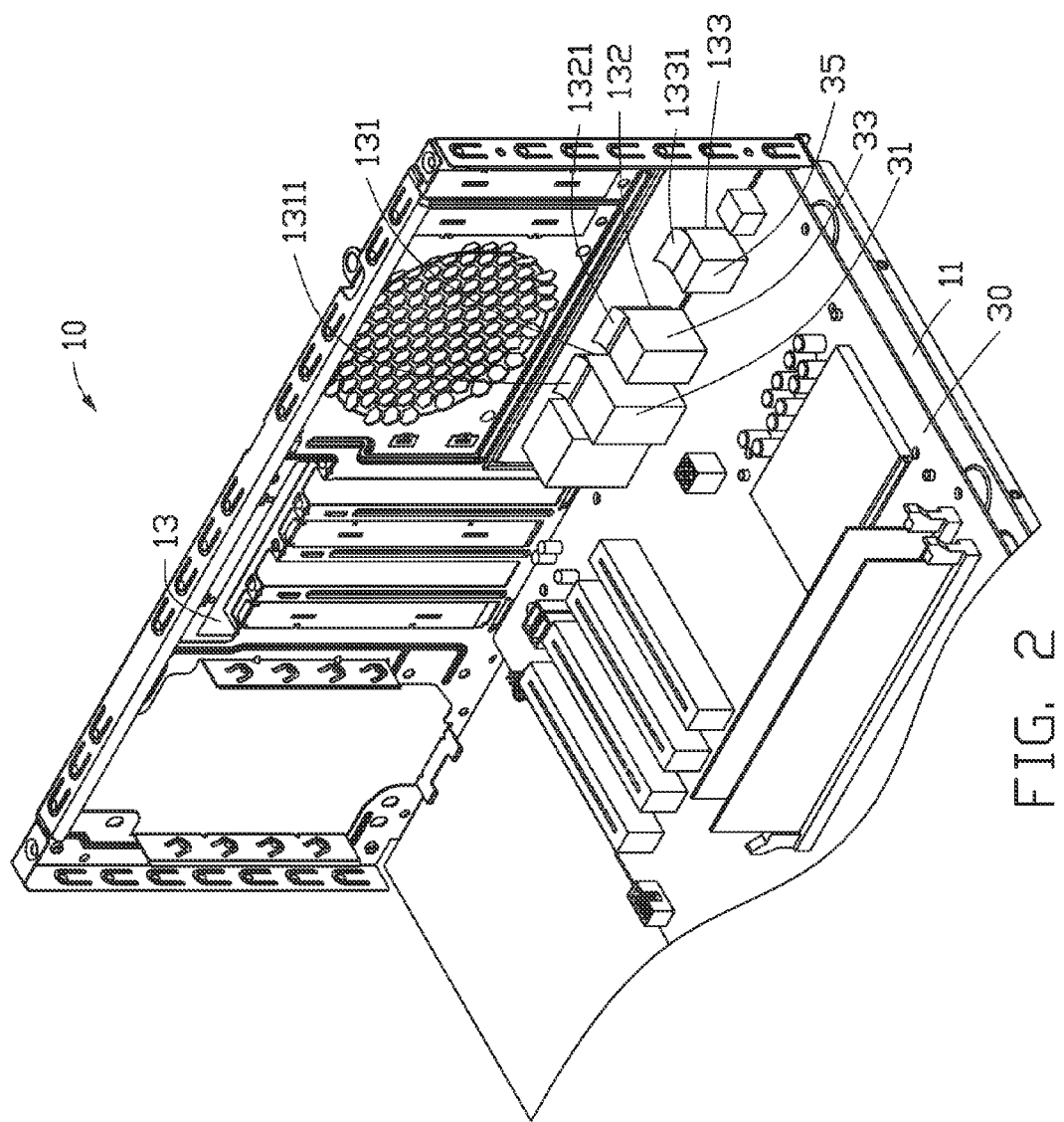
FIG. 2 is an assembled view of the electronic device enclosure of FIG. 1.

FIG. 5 shows the first principal stress distribution of the chassis 10 in accordance with one embodiment of FIGS. 1-2, which has the first, second and third flanges 1311, 1321, 1331. When the chassis 10 suffers an impact, the tensile stress is applied on the motherboard 30 in one direction but an opposing force is applied due to the resilience of the first, second and third flanges 1311, 1321, 1331. With the first, second and third flanges 1311, 1321, 1331, the motherboard 30 only resiliently deforms relative to the chassis bottom wall 11 a distance shown in FIG. 5 under the external force shown in FIG. 3.

Referring to FIG. 5, the distance the motherboard 30 resiliently deforms is often less than 1.0 millimeter, and at most 1.1 millimeters, and the most in the other direction is minus 0.4 millimeters. Therefore, misalignment of the module is minimized and engagement with openings of the rear wall 14 maintained.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An electronic device enclosure comprising:
   a chassis, the chassis comprising a chassis bottom wall and a chassis rear wall substantially perpendicular to the chassis bottom wall; the chassis bottom wall capable of mounting a motherboard with a module; and
   a flange connected to the chassis rear wall and substantially perpendicular to the chassis bottom wall; the flange capable of engaging with the module of the motherboard to secure the module between the flange and the motherboard.

2. The electronic device enclosure of claim 1, wherein the width of the flange is substantially the same as the width of the module.

3. The electronic device enclosure of claim 1, wherein an opening is defined on the chassis rear wall, and the flange extends from an edge of the opening.

4. The electronic device enclosure of claim 3, wherein the flange is extend into an interior of the chassis.

5. An electronic device comprising:
   a chassis, the chassis comprising a chassis bottom wall and a chassis rear wall connected to the chassis bottom wall, the chassis rear wall defining an opening, and a flange extending from an edge of the opening; and
   a motherboard with a module mounted on the chassis bottom wall, the module is substantially adjacent the chassis rear wall and corresponds to the opening of chassis rear wall, and the module connecting the data wire or the card which passed through the opening;
   wherein the flange engages with the module to prevent the module of the motherboard from moving out of alignment with the opening of the chassis rear wall.

6. The electronic device of claim 5, wherein the flange is elastic.

7. The electronic device of claim 5, wherein the width of the flange is substantially the same as the width of the module.

8. The electronic device of claim 5, wherein the flange extends into an interior of the chassis.

9. The electronic device of claim 5, wherein the module connecting the data wire is a USB data wire.

10. The electronic device of claim 5, wherein the module connecting the card is a network card.

* * * * *